(12) United States Patent
Ishida

(10) Patent No.: US 8,087,505 B2
(45) Date of Patent: Jan. 3, 2012

(54) POWER UNIT FOR VEHICLE AND VEHICLE EQUIPPED WITH THE SAME

(75) Inventor: Yousuke Ishida, Shizouda (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 707 days.

(21) Appl. No.: 12/262,162

(22) Filed: Oct. 30, 2008

(65) Prior Publication Data

US 2009/0127060 A1 May 21, 2009

(30) Foreign Application Priority Data

Nov. 15, 2007 (JP) .................................. 2007-296466

(51) Int. Cl.
*F16D 28/00* (2006.01)
(52) U.S. Cl. .......... 192/84.6; 192/70; 192/90; 192/84.7; 192/20; 192/89.21
(58) Field of Classification Search ............... 192/20, 192/84.6, 84.7, 90, 89.21, 96, 93 A
See application file for complete search history.

(56) References Cited

U.S. PATENT DOCUMENTS

| | | | | |
|---|---|---|---|---|
| 2,144,024 | A * | 1/1939 | La Brie ................. | 188/140 R |
| 4,650,056 | A * | 3/1987 | Sevennec et al. ............ | 192/90 |
| 6,105,743 | A * | 8/2000 | Salecker et al. ............ | 192/84.6 |
| 7,213,482 | B2 * | 5/2007 | Minasian et al. ............ | 74/421 A |
| 7,912,613 | B2 * | 3/2011 | Kosugi ............................. | 701/51 |
| 8,002,099 | B2 * | 8/2011 | Hayakawa et al. ............ | 192/83 |
| 2006/0169569 | A1 * | 8/2006 | Ooishi et al. .................. | 192/99 S |
| 2008/0011575 | A1 * | 1/2008 | Oishi .......................... | 192/93 A |
| 2008/0224499 | A1 * | 9/2008 | Yokomori ..................... | 296/155 |
| 2009/0057090 | A1 * | 3/2009 | Hayakawa et al. ............. | 192/83 |

FOREIGN PATENT DOCUMENTS

JP 2006-17221 1/2006

* cited by examiner

*Primary Examiner* — David D Le
*Assistant Examiner* — Jude Agendia
(74) *Attorney, Agent, or Firm* — Dickstein Shapiro LLP

(57) ABSTRACT

A compact power unit for a vehicle having a clutch actuator is provided. The power unit includes a clutch actuator and a drive force transmission mechanism for transmitting the drive force of the clutch actuator to the clutch. The clutch actuator and the drive force transmission mechanism are arranged within a casing of the power unit. A drive shaft of the clutch actuator extends in the vertical direction. The drive force transmission mechanism includes a worm shaft coupled to the drive shaft of the clutch actuator, a first solid of revolution including a worm wheel portion which engages the worm shaft, a second solid of revolution which engages a gear portion of the first solid of revolution, and a ball cam. The ball cam converts torque from the second solid of revolution into a force which acts in the axial direction of a slide shaft of the clutch.

19 Claims, 13 Drawing Sheets

POWER UNIT FOR VEHICLE AND VEHICLE EQUIPPED WITH THE SAME

PRIORITY INFORMATION

This patent application claims priority under 35 U.S.C. §119 to Japanese Patent Application No. 2007-296466, filed on Nov. 15, 2007, the entire contents of which is hereby expressly incorporated by reference.

TECHNICAL FIELD

The present invention relates to a power unit for a vehicle which has a clutch actuator.

BACKGROUND ART

Vehicles equipped with a so-called ATM (Automated Manual Transmission) are known. Such vehicles include motorcycles, ATVs (All Terrain Vehicles) and the like. The ATM performs clutch disengagement and engagement as well as changing of a transmission gear of a transmission by utilizing an actuator, such as a motor.

Japanese Patent Publication 2006-017221 discloses a clutch actuator which generates drive force to perform disengagement and engagement of the clutch and a drive force transmission mechanism which transmits the drive force of the clutch actuator to the clutch. The clutch actuator and the drive force transmission mechanism are arranged outside a casing of a power unit. Specifically, the clutch actuator and the drive force transmission mechanism are arranged behind a cylinder of the power unit above a crankcase. The clutch actuator is attached to the crankcase with a bracket. A drive shaft of the clutch actuator is arranged so as to extend in the vehicle-width direction. The drive force transmission mechanism connects the clutch actuator and a clutch disengaging rod (a push rod) disposed on the outside of the power unit.

However, in the vehicle described in Japanese Patent Publication 2006-017221, the clutch actuator and the drive force transmission mechanism are arranged above the crankcase, resulting in the power unit being upsized in the vertical direction by a space requirement for the clutch actuator and the drive force transmission mechanism.

On the other hand, in order to provide an empty space above the crankcase, an arrangement in which the clutch actuator and the drive force transmission mechanism are placed outside of the side portion of the crankcase may be devised. However, when the clutch actuator and the drive force transmission mechanism are merely arranged at the side portion of the crankcase without a corresponding design modification, the horizontal width (i.e. the dimension in the vehicle-width direction) of the entire power unit (including the clutch actuator and drive force transmission mechanism) becomes relatively large. Consequently, the entire power unit increases in size in the crosswise direction.

SUMMARY

The present invention has been devised in view of the problems described above. To this end, one object of the present invention is to permit downsizing of the power unit of vehicles equipped with a clutch actuator.

A power unit for a vehicle in accordance with one embodiment of the present invention comprises a clutch which has a slide shaft extending in the crosswise direction and which is disengaged and engaged by moving the slide shaft in the axial direction; a clutch actuator which has a rotatable drive shaft; a drive force transmission mechanism which connects the rotatable drive shaft of the clutch actuator with the slide shaft of the clutch and which transmits the drive force of the clutch actuator to the slide shaft; and a casing which accommodates the clutch, the clutch actuator and the drive force transmission mechanism.

The clutch actuator and the drive force transmission mechanism may be arranged at the left end portion or the right end portion of the inside of the casing. The clutch actuator is arranged so that the drive shaft extends in a direction which is perpendicular to the crosswise direction. The drive force transmission mechanism comprises a worm shaft which is coupled to the drive shaft, a first solid of revolution which has a worm wheel portion that engages the worm shaft and which rotates around an axis of rotation which is parallel to the longitudinal axis of the slide shaft in accordance with rotation of the worm shaft, a second solid of revolution which rotates around an axis of rotation that is coincident with the longitudinal axis of the slide shaft in accordance with rotation of the first solid of revolution, and a force direction converting mechanism which converts torque from the second solid of revolution into a force which acts in the axial direction of the slide shaft and which moves the slide shaft in the axial direction in accordance with rotation of the second solid of revolution.

According to the above-described power unit for a vehicle, the clutch actuator and the drive force transmission mechanism are arranged at the left end portion or the right end potion of the inside of the casing, thereby the clutch actuator and the drive force transmission mechanism do not project outside of the casing. Further, the drive force transmission mechanism includes the first solid of revolution and the second solid of revolution which have axes that are displaced from each other. The drive force of the clutch actuator is transmitted to the clutch via the plurality of solids of revolution. Accordingly, the drive force can be transmitted from the clutch actuator to the slide shaft without using a rod or the like that projects further in one direction. Therefore, the drive force transmission mechanism can be compactly arranged in the casing. Furthermore, the clutch actuator is arranged so that the drive shaft extends in a direction which is perpendicular to the crosswise direction, thereby suppressing projection of the clutch actuator in the crosswise direction. Thus, the clutch actuator can be compactly arranged in the casing. Accordingly, downsizing of the power unit of a vehicle having a clutch actuator may be achieved.

DETAILED DESCRIPTION

In the following description, an embodiment of the present invention is described in detail with reference to the appended drawings.

Motorcycle

Figure 1:
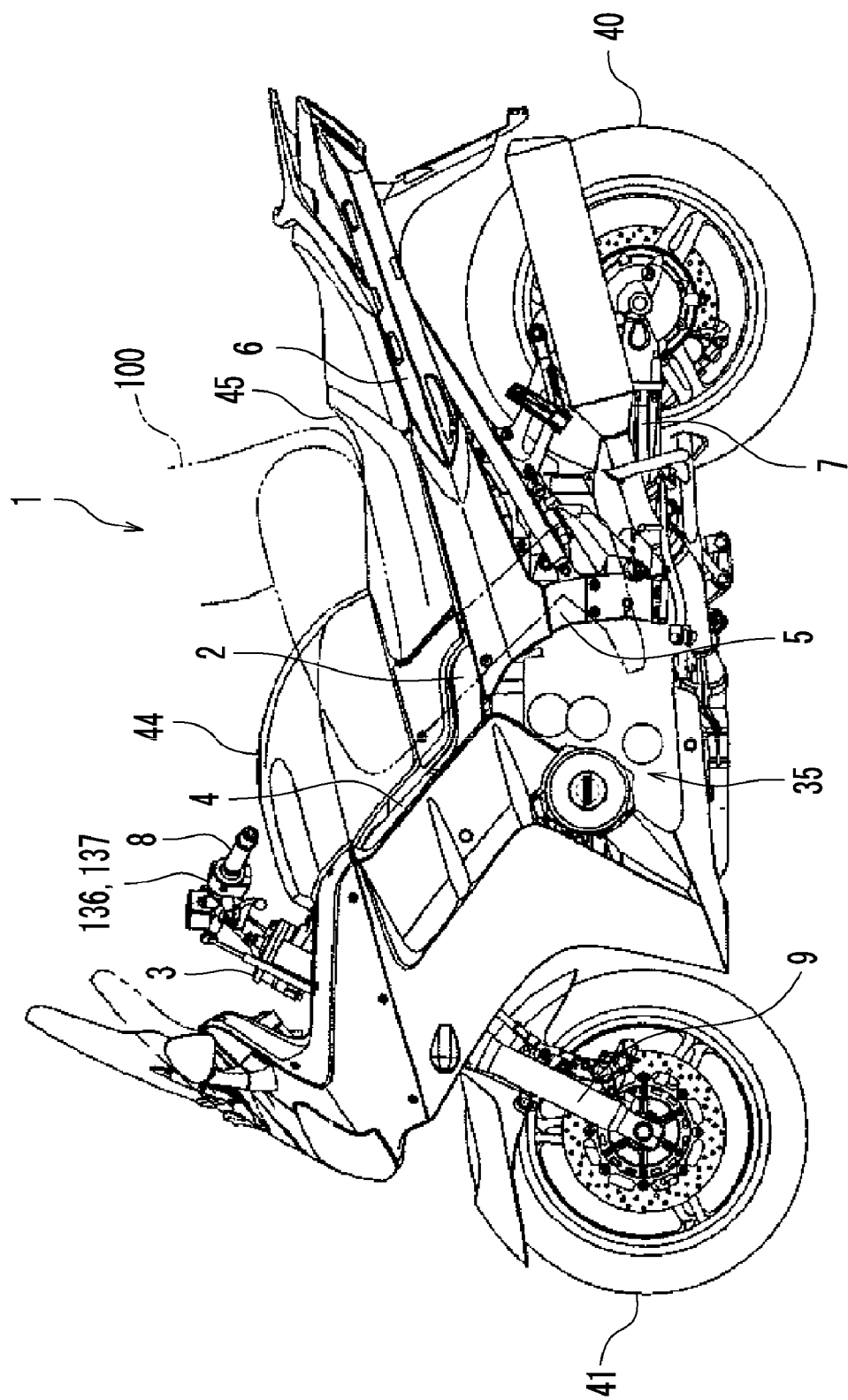
FIG. 1 is a side view of a motorcycle.

FIG. 1 is a side view which shows a motorcycle 1 according to an embodiment of the present patent document. As shown in FIG. 1, the motorcycle 1 includes a body frame 2. The body frame 2 has a head pipe 3, a main frame 4 which extends rearward from the head pipe 3 and a rear-arm bracket 5 which extends downward from a rear part of the main frame 4.

A front fork 9 is supported by the head pipe 3. A steering handle 8 is disposed at the top end of the front fork 9. A front wheel 41 is disposed at the bottom end of the front fork 9. A fuel tank 44 is disposed on the main frame 4. A seat 45 is arranged toward the rear side of the fuel tank 44. The seat 45 is mounted on a seat rail 6. A power unit 35 is suspended by the main frame 4 and rear-arm bracket 5. A front end part of a rear arm 7 is supported by the rear-arm bracket 5 pivotally in the vertical direction. A rear wheel 40 is supported on the rear end portion of the rear arm 7.

Automatic transmission operation switches 136, 137 (see FIG. 2), which are operated by a rider 100 sitting astride the seat 45, are disposed on the steering handle 8.

Power Unit

Figure 3:
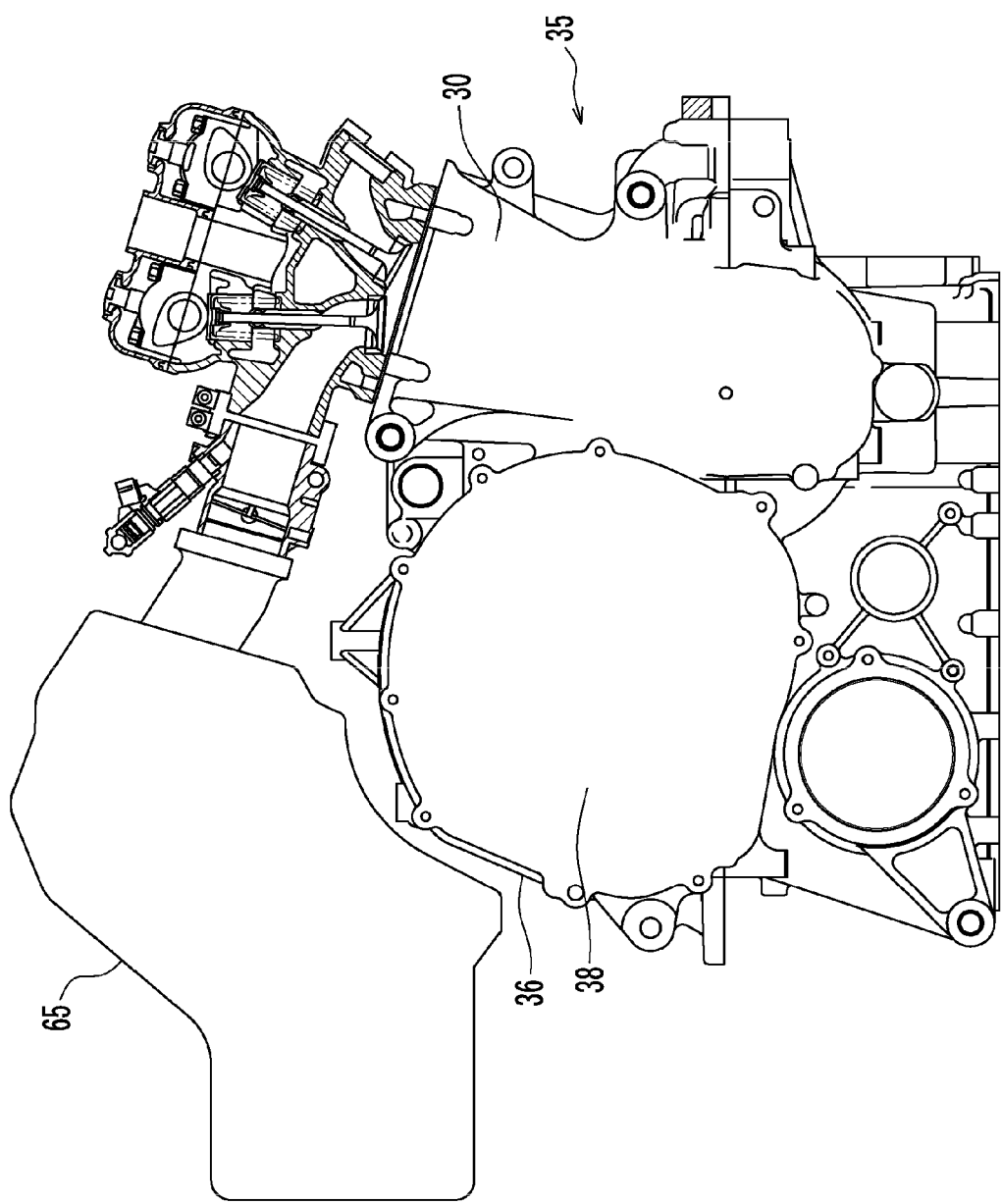
FIG. 3 is a right side view of a power unit of the motorcycle of FIG. 1.

FIG. 3 is a right side view of the power unit 35. In FIG. 3, a reference numeral 65 generally denotes an air cleaner.

Figure 4:
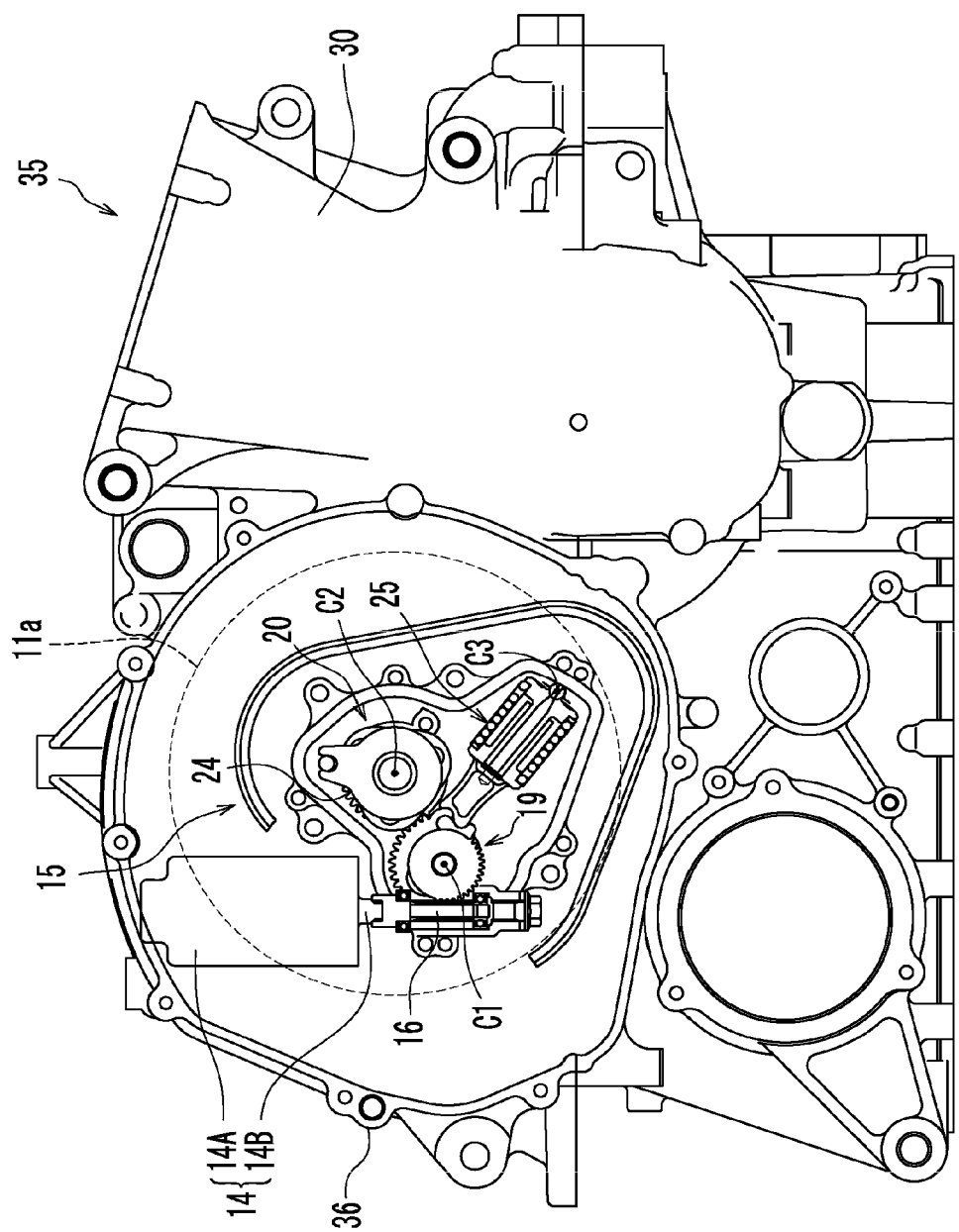
FIG. 4 is a right side view of the power unit of FIG. 3 with the cover 38 removed to show a drive force transmission mechanism.

FIG. 4 is a right side view of a main part of the power unit 35 when a cover 38 is removed.

Figure 5:
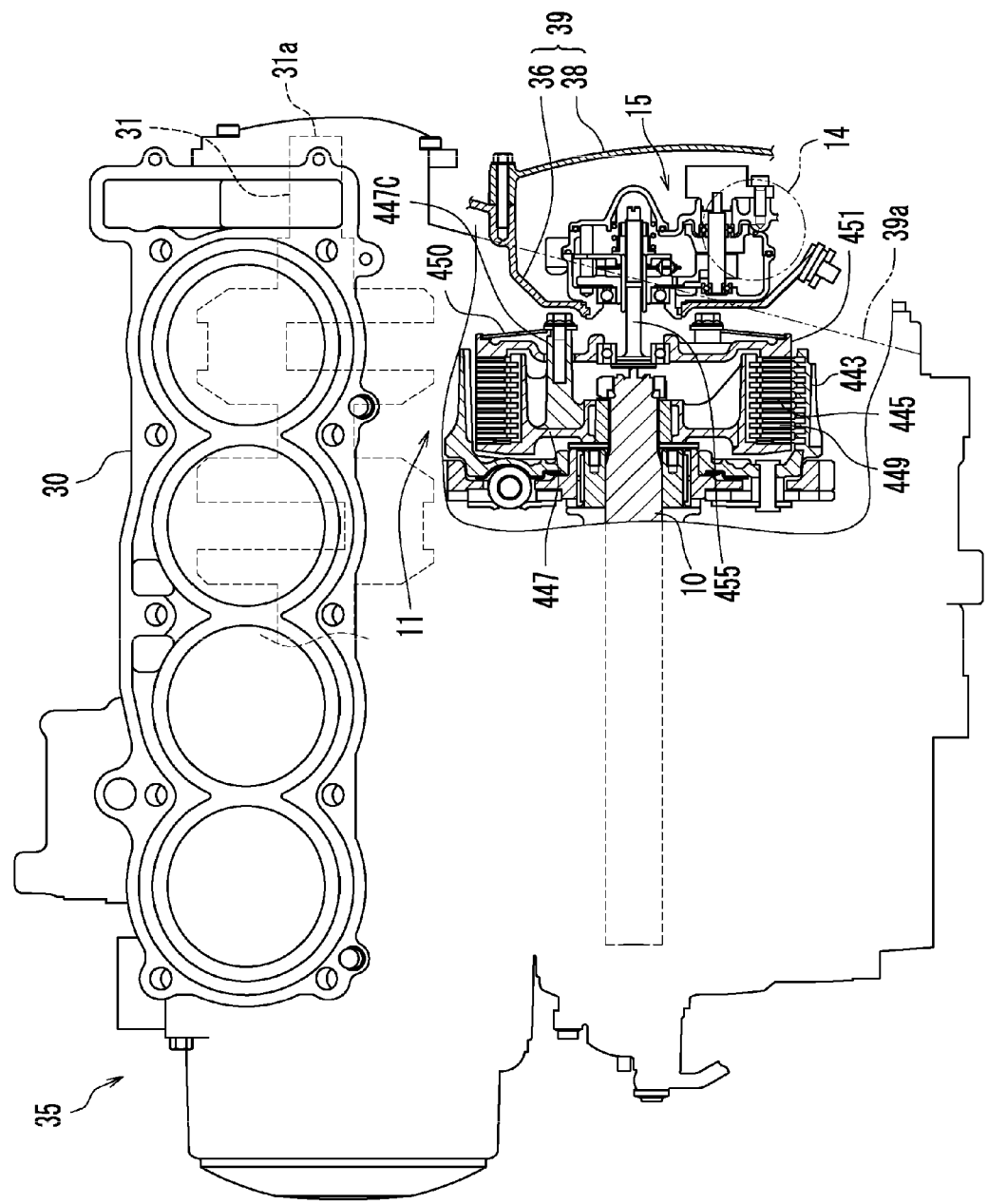
FIG. 5 is a top plan view in which a portion of the power unit is removed or cutaway.

FIG. 5 is a top plan view in which a portion of the power unit 35 is removed.

Figure 6:
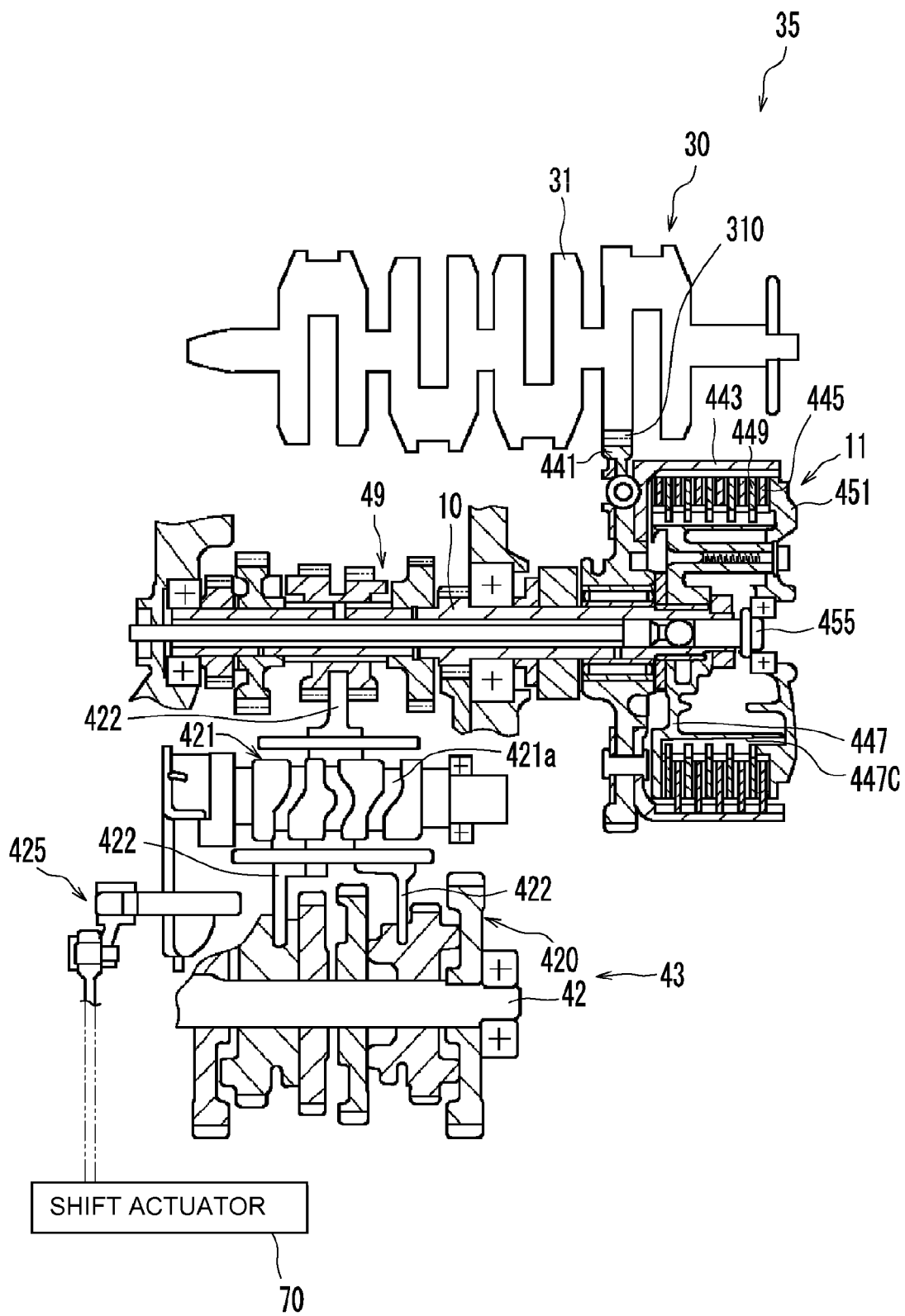
FIG. 6 is a schematic view which shows the main components of the power unit of FIG. 3.

FIG. 6 is a view which schematically shows the inner structure of the power unit 35. As shown in FIG. 6, the power unit 35 includes an engine 30, a clutch 11 and a transmission 43. Power unit 35 also includes a clutch actuator 14 (see FIG. 4) which disengages and engages the clutch 11 and a shift actuator 70 which operates the transmission 43.

Engine

In the present embodiment, the engine 30 is a water-cooled, transverse four-stroke and parallel four-cylinder engine. Engine 30, however, is not limited to an internal combustion engine, such as a gasoline engine, but may be comprise any suitable engine, including an electric motor engine. Furthermore, the engine 30 may comprise a combination of a gasoline engine and an electric motor engine. The engine 30 has a crankshaft 31 which extends in the crosswise direction of motorcycle 1. A gear 310 is formed on the crankshaft 31.

Clutch

As shown in FIG. 6, the clutch 11 according to the present embodiment is a multiplate friction clutch. However, clutch 11 is not limited to a multiplate friction clutch configuration. Other suitable clutch configurations may also be utilized. The clutch 11 has a clutch housing 443, a plurality of friction plates 445 which are integrally disposed on the clutch housing 443, a clutch boss 447, a plurality of clutch plates 449 which are integrally disposed on the clutch boss 447, and a pressure plate 451 which generates pressurized contact between the friction plates 445 and the clutch plates 449.

A gear 441 is supported on a main shaft 10 of transmission 43 in a state free to rotate with respect to the main shaft 10. The gear 441 is operatively engaged with the gear 310 of the crankshaft 31. The clutch housing 443 is fixed to the gear 441 so that clutch housing 443 rotates integrally with the gear 441. Accordingly, torque is transmitted from the crankshaft 31 to the clutch housing 443 via the gear 441.

As shown in FIG. 5, a plurality of cylindrical guiding portions 447C, which are integrally formed with the clutch boss 447 and which extend in the axial direction of the main shaft 10, are arranged inside the cylindrical clutch boss 447. A spring 450, which comprises a disc spring, is attached to the guiding portion 447C. The spring 450 urges the pressure plate 451 leftward in FIG. 5. In other words, the spring 450 urges the pressure plate 451 in the direction of engagement of the clutch 11.

Pressure plate 451 is driven by the clutch actuator 14 and moved in the axial direction of a slide shaft 455. When the clutch 11 is engaged, the slide shaft 455 moves to the left in FIG. 5 and the pressure plate 451 also moves leftward in a similar fashion. As a result, the pressure plate 451, which receives the urging force of the spring 450, forces friction plate 445 to press onto clutch plate 449. Accordingly, friction force is generated between the friction plate 445 and the clutch plate 449, thereby drive force is transmitted from the clutch housing 443 to the clutch boss 447 in the clutch 11.

On the other hand, when the clutch 11 is disengaged, the slide shaft 455 moves to the right in FIG. 5 and the pressure plate 451 also moves rightward in FIG. 5 against the urging force of the spring 450. As a result, the pressed contact state between the friction plate 445 and the clutch plate 449 is released. Accordingly, drive force is not transmitted from the clutch housing 443 to the clutch boss 447 in the clutch 11.

In this manner, depending on the magnitude of the drive force of the clutch actuator 14 and the biasing force of the spring 450, the pressure plate 451 moves toward or away from main shaft 10. According to this movement, the clutch 11 goes into an engaged state or a disengaged state.

Transmission

As shown in FIG. 6, the transmission 43 includes the main shaft 10, which is arranged parallel to the crankshaft 31 of the engine 30, and a drive shaft 42 which is also arranged parallel to the main shaft 10. Multistage transmission gears 49 are disposed on the main shaft 10. Multistage transmission gears 420 are disposed on the drive shaft 42. A transmission gear 49 on the main shaft 10 engages with a transmission gear 420 on the drive shaft 42. Here, in FIG. 6, the transmission gears 49 and the transmission gears 420 are illustrated as being separated. Except for a selected pair of transmission gears, either or both of the transmission gears 49 and the transmission gears 420 are arranged so as to be in a condition of idling rotation (that is, a condition of free rotation) relative to the main shaft 10 or the drive shaft 42. Accordingly, the transmission of torque from the main shaft 10 to the drive shaft 42 is performed only via the selected pair of the transmission gears.

The gear change operation to change a transmission gear ratio by selecting the transmission gear 49 and the transmission gear 420 is performed by the rotation of a shift cam 421. The shift cam 421 has a plurality of cam grooves 421a and a shift fork 422 is attached to each of the cam grooves 421a. Each of the shift forks 422 engages a predetermined transmission gear 49 and transmission gear 420 of the main shaft 10 and the drive shaft 42, respectively. Due to the rotation of the shift cam 421, the shift forks 422 are guided by the cam grooves 421a and move in the direction of each axis. As a result, only a single pair of the transmission gears 49 and the transmission gears 420 at the positions which correspond to a rotational angle of the shift cam 421 are in a fixed state respectively to the main shaft 10 and the drive shaft 42 by a spline. Positions of the transmission gears are thereby determined and the torque is transmitted between the main shaft 10 and the drive shaft 42 at a predetermined transmission gear ratio via the transmission gear 49 and the transmission gear 420.

A shift actuator 70 is operatively connected to the shift cam 421 via a connecting mechanism 425. The type of shift actuator 70 used is not limited to any specific embodiment. For example, an electric motor and the like may be utilized. The shift actuator 70 rotates the shift cam 421 via the connecting mechanism 425 and performs a gear change operation.

Clutch Actuator and Drive Force Transmission Mechanism

Next, the clutch actuator 14, which generates the drive force needed to perform disengagement and engagement of the clutch 11, and a drive force transmission mechanism 15, which transmits the drive force of the clutch actuator 14, are explained.

As shown in FIG. 4 and FIG. 5, the clutch actuator 14 and the drive force transmission mechanism 15 are arranged inside a casing 39 of the power unit 35. Specifically, as shown in FIG. 5, the casing 39 of the power unit 35 includes a crankcase 36 which accommodates the crankshaft 31 and the clutch 11, and a cover 38 which covers a portion of the right end of the crankcase 36. The clutch actuator 14 and the drive force transmission mechanism 15 are arranged outside the crankcase 36 and inside the cover 38. In other words, the clutch actuator 14 and the drive force transmission mechanism 15 are covered by the cover 38 on the outside of the crankcase 36.

The clutch actuator 14 and the drive force transmission mechanism 15 are arranged at one end in the crosswise direction in the casing 39. The clutch actuator 14 and the drive force transmission mechanism 15 may be arranged at either the left end or the right end of the transmission 43 in the casing 39. In the present embodiment, the clutch actuator 14 and the drive force transmission mechanism 15 are arranged at the right end of the transmission 43 in the casing 39. Further, in the present embodiment, the clutch actuator 14 and the drive force transmission mechanism 15 are arranged at the side where the clutch 11 is arranged in the crosswise direction. However, it is also possible to arrange the clutch actuator 14 and the drive force transmission mechanism 15 on the side of the transmission 43 which is opposite in the crosswise direction to the side where the clutch 11 is arranged.

As shown in FIG. 4, the clutch actuator 14, according to the present embodiment, includes an electric motor. The clutch actuator 14 has a motor body 14A which is approximately cylindrical in shape and a drive shaft 14B which projects downward from the motor body 14A. The clutch actuator 14 is arranged so that the motor body 14A and the drive shaft 14B extend vertically.

Figure 7A:
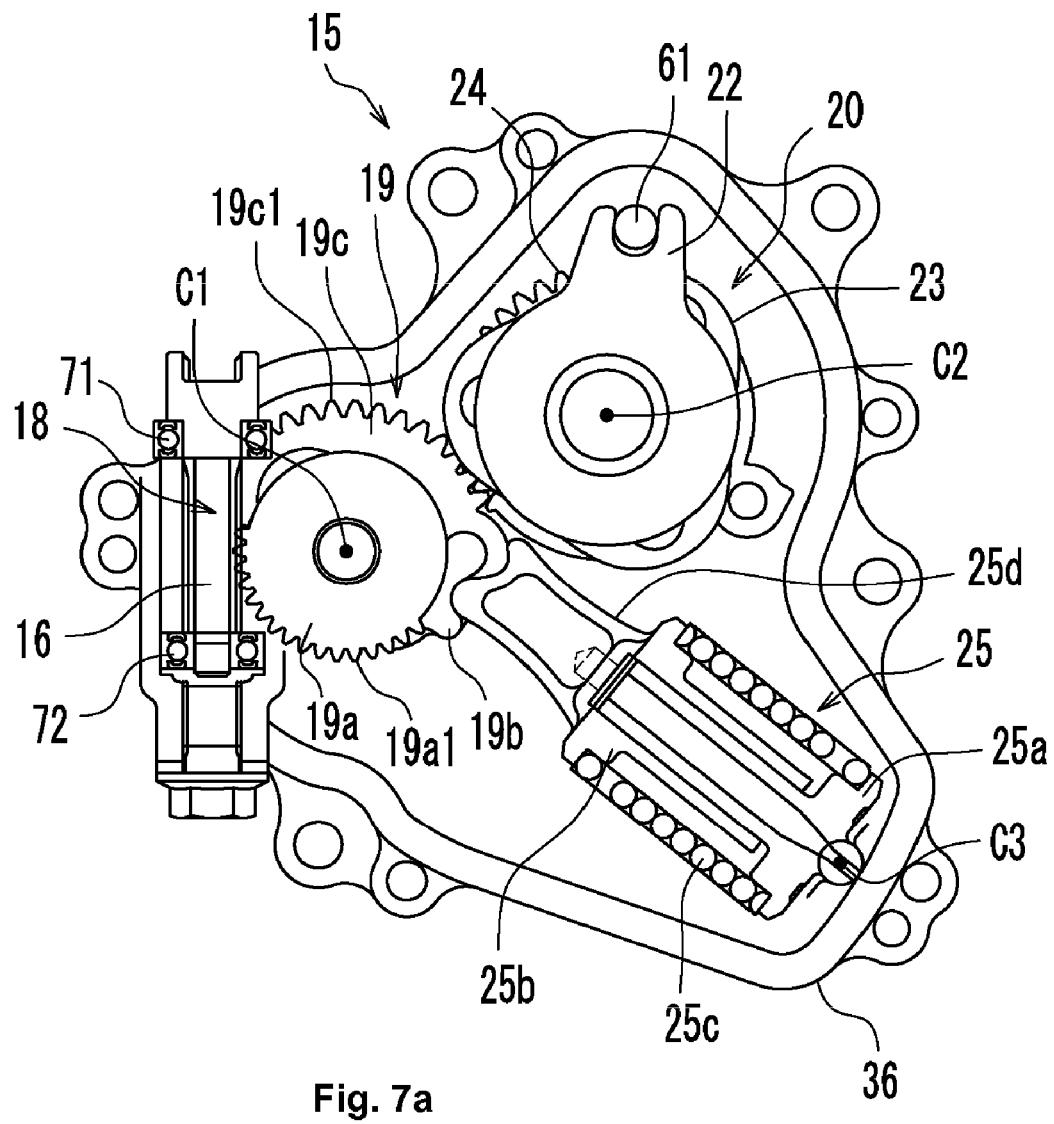
FIG. 7*a* is an enlarged right side view of the drive force transmission mechanism when the clutch is engaged.

As shown in FIGS. 4 and 7a, the drive force transmission mechanism 15 includes a worm shaft 16, which is connected to the drive shaft 14B of the clutch actuator 14, a first solid of revolution 19, which engages with the worm shaft 16, a second solid of revolution 24 which engages with the first solid of revolution 19 (see FIG. 9) and a ball cam 20 which converts the torque of the second solid of revolution 24 into a force in the axial direction of the slide shaft 455. Here, as described below, in the present embodiment, the second solid of revolution 24 constitutes a part of the ball cam 20. However, it is also possible to separate the second solid of revolution 24 from the ball cam 20.

The worm shaft 16 extends in the vertical direction. A helical groove is formed on the outer peripheral surface of the worm shaft 16. The worm shaft 16 is rotatably supported by bearings 71, 72. In the present embodiment, the drive shaft 14B of the clutch actuator 14 and the worm shaft 16 are configured as separate components. However, it is also possible that the drive shaft 14B and the worm shaft 16 are integrated.

Figure 8:
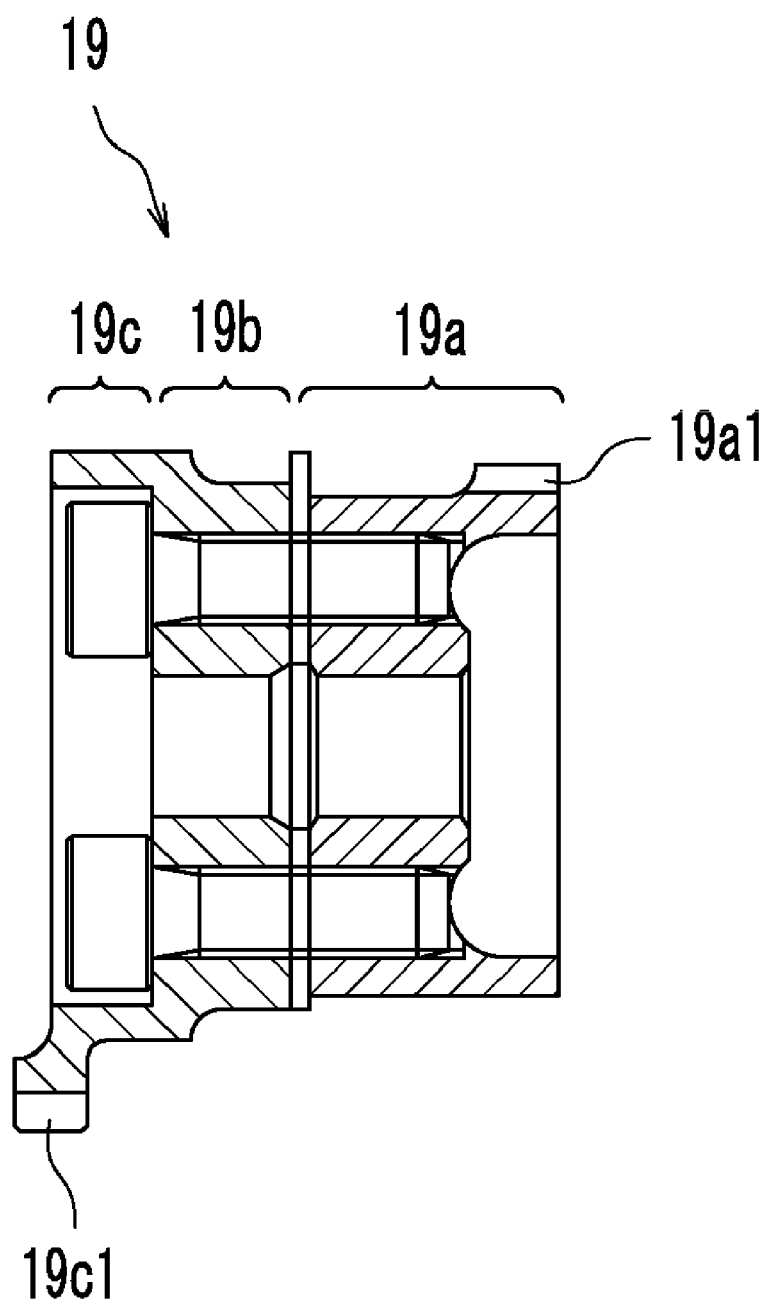
FIG. 8 is a cross-sectional view of a first solid of revolution of the drive force transmission mechanism.

As shown in FIG. 7a and FIG. 8, the first solid of revolution 19 includes a worm wheel portion 19a, a cam portion 19b and a gear portion 19c in this order from the right side to the left side (or from the front face to the back face of the sheet in FIG. 7a). As shown in FIG. 7a, a plurality of teeth 19a1 are formed on an outer peripheral portion of worm wheel portion 19a. The worm wheel portion 19a is engaged with the worm shaft 16. Accordingly, the torque of the worm shaft 16 is transmitted to the worm wheel portion 19a, and the first solid of revolution 19 rotates in accordance with the worm shaft 16. The worm shaft 16 and the worm wheel portion 19a of the first solid of revolution 19 together constitute a worm gear 18.

The cam portion 19b of the first solid of revolution 19 is in contact with a corresponding contact portion 25d of an assist spring unit 25 (FIG. 7a) which is described hereinbelow.

Teeth 19c1 are formed on an outer peripheral portion of gear portion 19c of the first solid of revolution 19. The radius of the gear portion 19c (to be exact, the distance from the axis of rotation C1 of the first solid of revolution 19 to the teeth 19c1) is greater than the radius of the worm wheel portion 19a (to be exact, the distance from the axis of rotation C1 of the first solid of revolution 19 to the teeth 19a1). However, the difference in length between the radius of the gear portion 19c and the radius of the worm wheel portion 19a may be configured to be the opposite. Further, the radius of the gear portion 19c and the radius of the worm wheel portion 19a may be the same as well.

Figure 10:
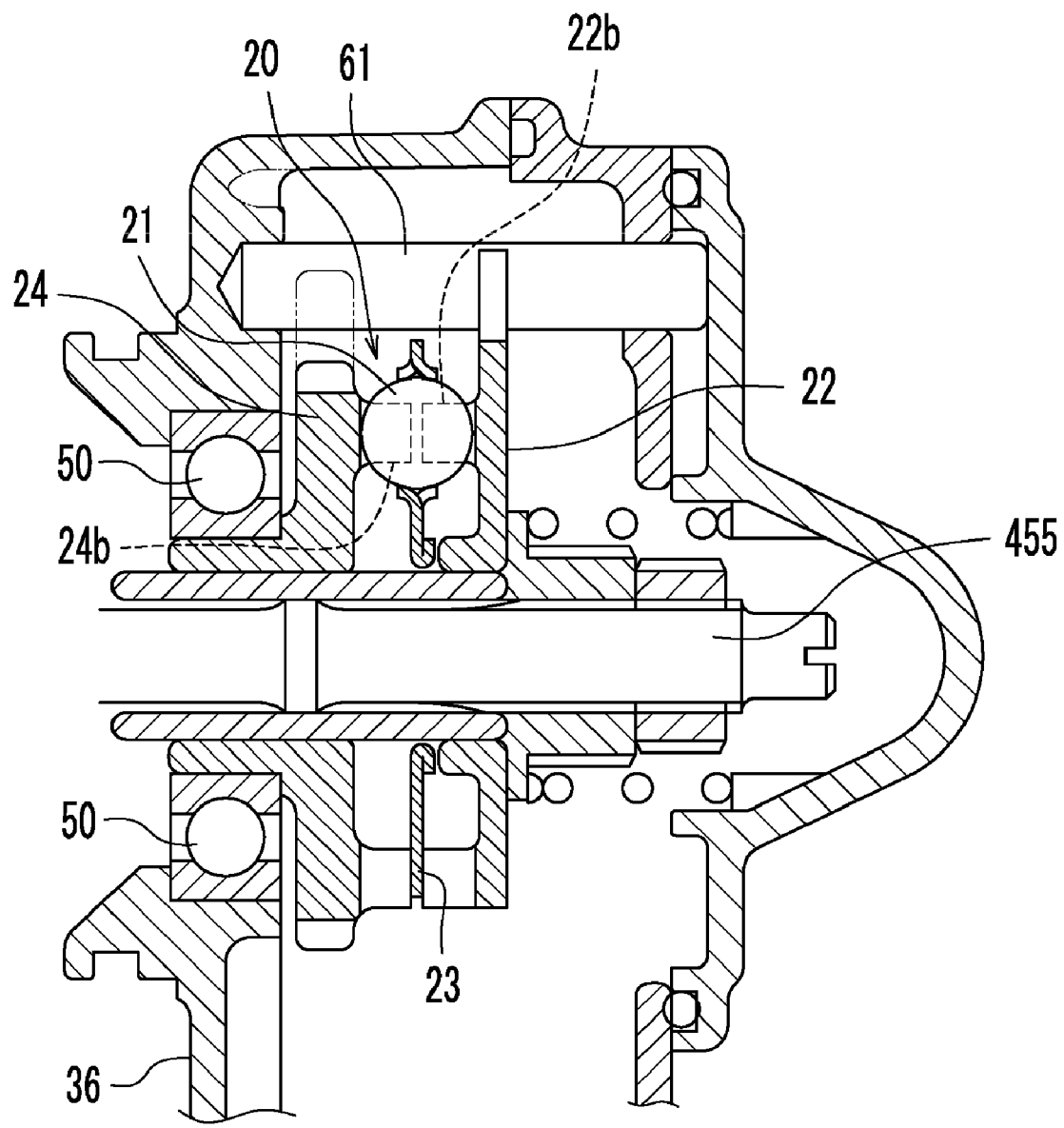
FIG. 10 is a cross-sectional view of the ball cam when the clutch is engaged.

As shown in FIG. 7a and FIG. 10, the ball cam 20 includes a cam plate 22, a ball plate 23 and the second solid of revolution 24 in this order from the right side to the left side (or from the front face to the back face of the sheet in FIG. 7a).

The cam plate 22 is fixed to the slide shaft 455 and is movable in the axial direction of the slide shaft 455 together with the slide shaft 455. However, rotation of the cam plate 22 around the slide shaft 455 is restricted by a stopper pin 61.

The ball plate 23 supports three balls 21 which are arranged at even intervals in a peripheral direction so as to be able to roll. However, the number of balls 21 in ball cam 20 does not have to be limited to three. Other suitable ball cam configurations may be utilized as needed.

Figure 9:
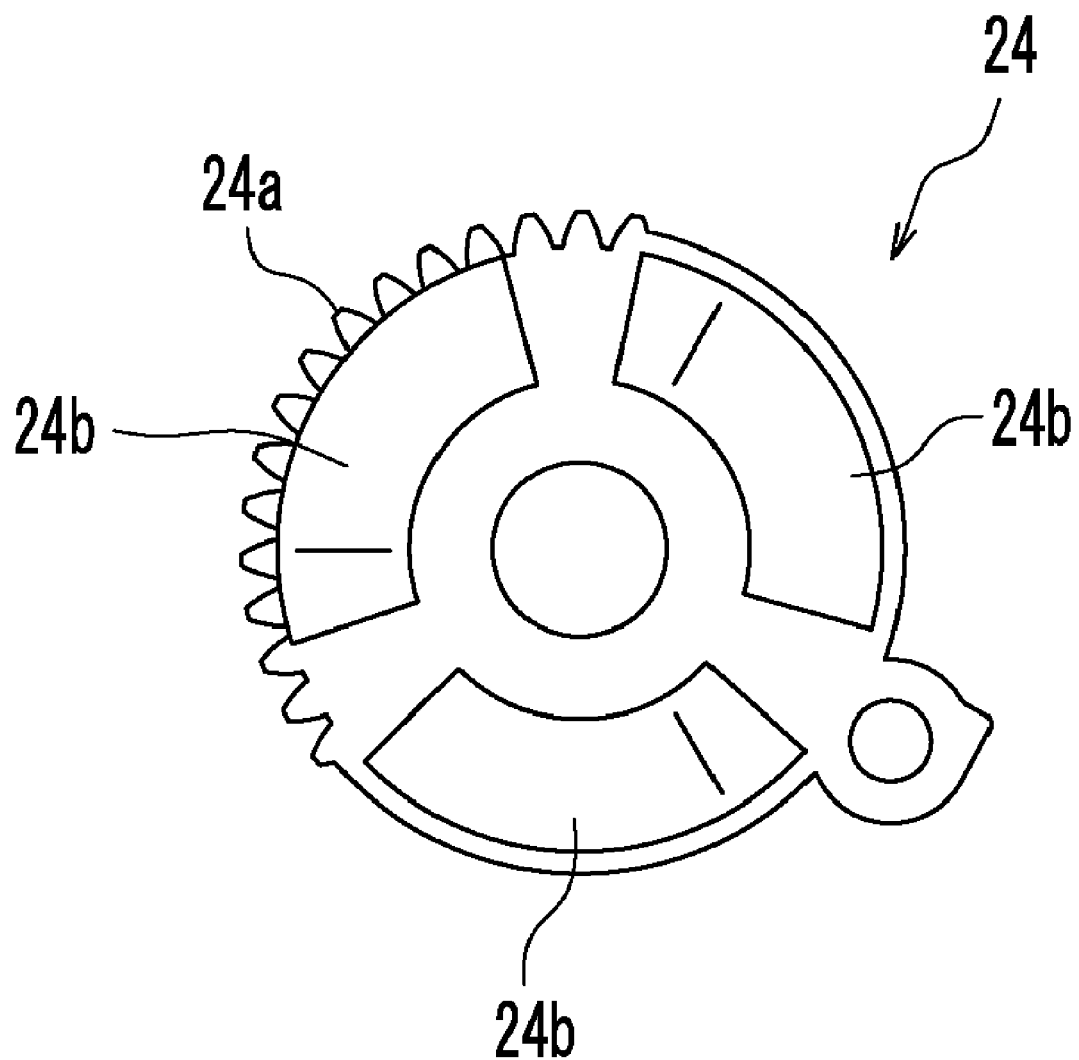
FIG. 9 is a cross-sectional view of a second solid of revolution of the drive force transmission mechanism.

As shown in FIG. 10, the second solid of revolution 24 is supported by a bearing 50 so as to be able to rotate around the slide shaft 455. On the other hand, the second solid of revolution 24 is arranged so as not to move in the axial direction of the slide shaft 455. As shown in FIG. 9, a plurality of teeth 24a are formed on an outer peripheral portion of second solid of revolution 24. The teeth 24a of second solid of revolution 24 are engaged with the teeth 19c1 of the gear portion 19c of the first solid of revolution 19 (see FIG. 7a). Accordingly, the first solid of revolution 19 and the second solid of revolution 24 are operatively connected with each other via the teeth 19c1 and the teeth 24a, respectively. Therefore, the torque of the first solid of revolution 19 is transmitted to the second solid of revolution 24.

Figure 7B:
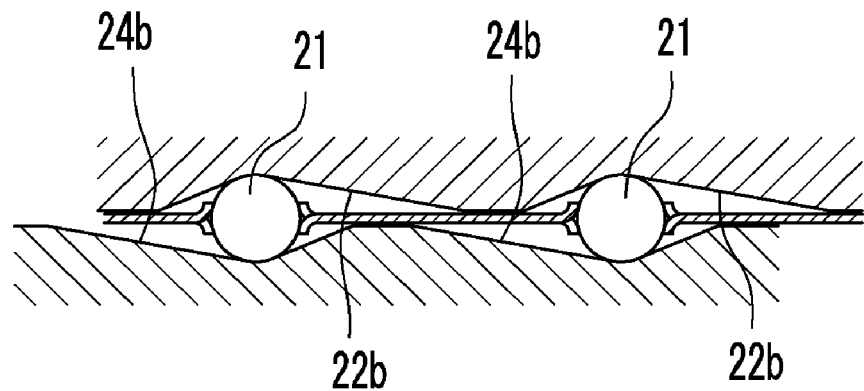
FIG. 7*b* is a schematic view which shows the positions of balls of a ball cam when the clutch is engaged.

Cam surfaces 22b, 24b, which are slanted along the circumferential direction, are respectively formed on the left side face (the upper side face in FIG. 7b) of the cam plate 22 and the right side face (the lower side face in FIG. 7b) of the second solid of revolution 24 (see also FIG. 9) to form a cam groove as shown in FIG. 7b. In this manner, the second solid of revolution 24 also functions as a cam plate. When the second solid of revolution 24 rotates, the relative position between the cam surface 22b of the cam plate 22 and the cam surface 24b of the second solid of revolution 24 is shifted. Consequently, the balls 21 climb and fall along the cam grooves 22b, 24b. Accordingly, the cam plate 22 may be pushed to the right by the balls 21 and so as to slide rightward. Correspondingly, the slide shaft 455 also slides rightward and the pressure plate 451 also moves to the right. As a result, the clutch 11 is switched from an engaged state to a disengaged state.

As shown in FIG. 7a, in the present embodiment, an assist spring unit 25, which generates an assist force that assists with disengaging the clutch 11, is operatively coupled with the drive force transmission mechanism 15. The assist spring unit 25 includes a first case 25a, which is approximately cylindrical, a second case 25b, which is approximately cylindrical and is combined with the first case 25a, a compression coil spring 25c, which is arranged between the first case 25a and the second case 25b, and the contact portion 25d which is disposed at the top end of the second case 25b. The contact portion 25d is in contact with the cam portion 19b of the abovementioned first solid of revolution 19, as illustrated in reference to FIG. 7a. The first case 25a and the second case 25b are urged by the compression coil spring 25c away from each other. Since the second case 25b is urged toward the contact portion 25d side by the compression coil spring 25c, the contact portion 25d is urged into a pressed contact condition with the cam portion 19b of the first solid of revolution 19. In this manner, the contact portion 25d and the cam portion 19b are operatively coupled without utilizing fasteners such as bolts.

The bottom side of the first case 25a is pivotally supported by the crankcase 36. Therefore, the assist spring unit 25 is configured to be free to swing around a center pivot axis C3.

Shift Change Operation

Figure 2:
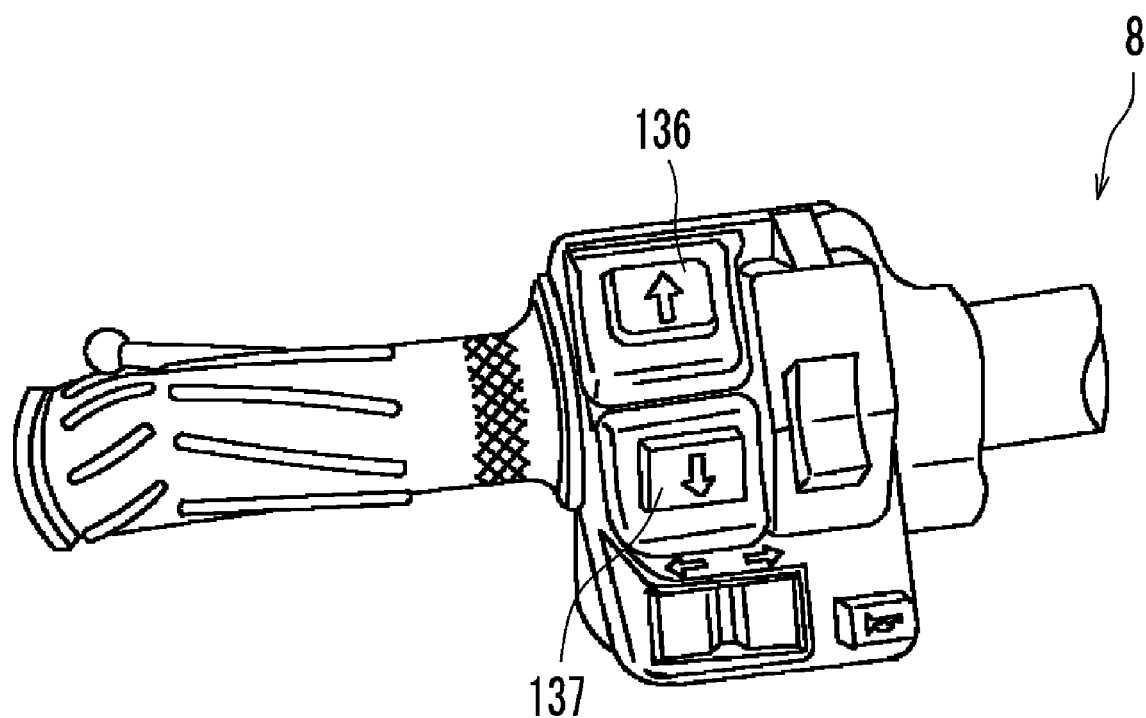
FIG. 2 is a perspective view of an automatic transmission operation switch of the motorcycle of FIG. 1.

Shift change of the motorcycle 1 is performed as follows. First, the rider 100 operates the automatic transmission operation switch 136 or 137 (FIG. 2). Then, a control system (not shown in the figures) of the motorcycle 1 controls the clutch actuator 14 (FIG. 4) and the shift actuator 70 (FIG. 6). Accordingly, a series of operations of disengaging the clutch 11, changing the transmission gear of the transmission 43 and engaging the clutch 11 are performed.

Disengagement and Engagement Operation of the Clutch 11

Next, the operation of disengaging and engaging the clutch 11 by the clutch actuator 14 is described.

Figure 11A:
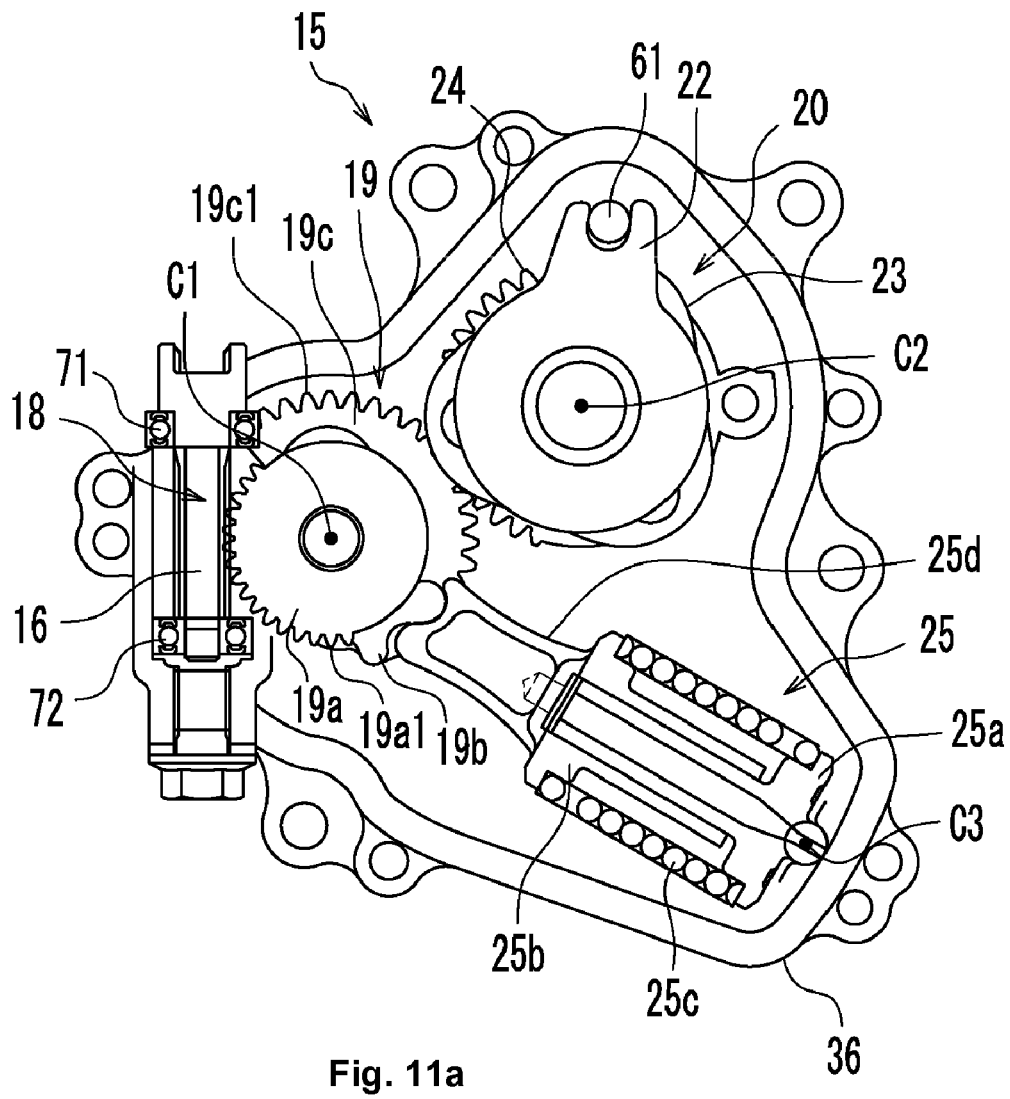
FIG. 11a is an enlarged side view of the drive force transmission mechanism when the clutch is at a starting position of disengagement.
Figure 11B:
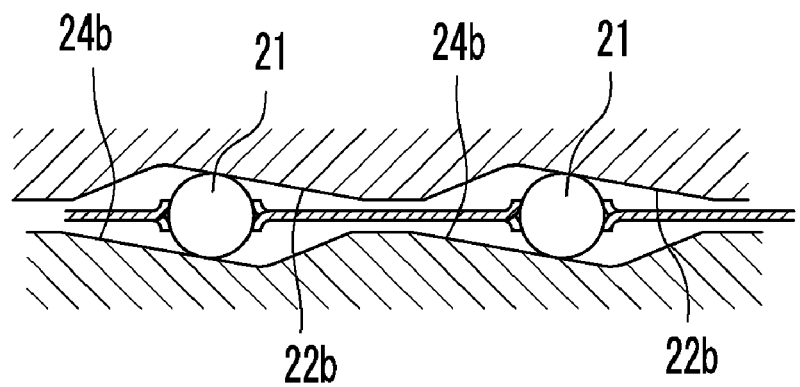
FIG. 11b is a schematic view which shows the positions of balls of a ball cam when the clutch is at a starting position of disengagement.
Figure 12A:
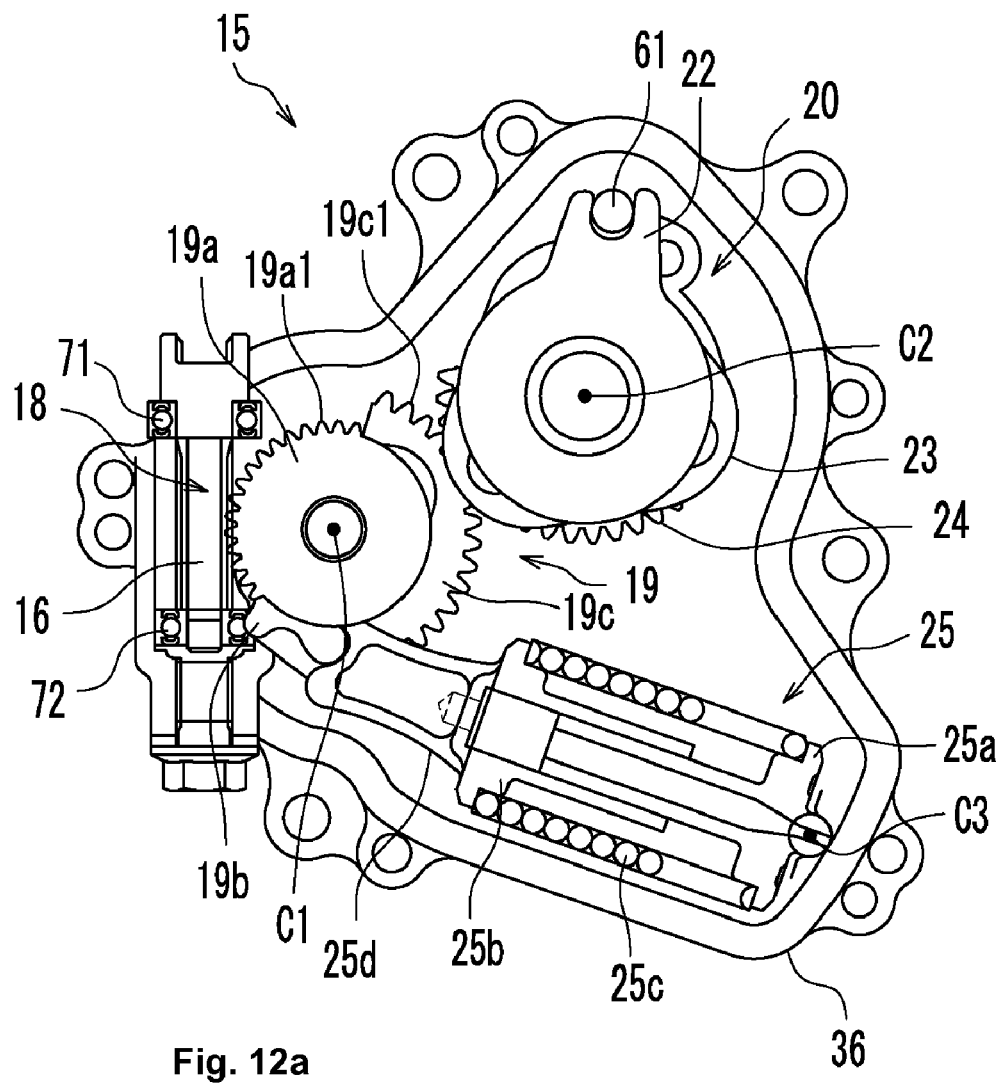
FIG. 12a is an enlarged side view of the drive force transmission mechanism when the clutch is disengaged.

FIG. 7a, FIG. 11a and FIG. 12a are side views of the drive force transmission mechanism 15. FIG. 7a shows the clutch 11 when it is engaged. FIG. 11a shows the clutch 11 when it starts to be disengaged. FIG. 12a shows the clutch 11 when it is disengaged.

As shown in FIG. 7a and FIG. 11a, when the clutch actuator 14 operates and the worm shaft 16 rotates, the first solid of revolution 19 rotates in the clockwise direction. Since the first solid of revolution 19 and the second solid of revolution 24 engage with each other, the second solid of revolution 24 rotates in the counterclockwise direction when the first solid of revolution 19 rotates in the clockwise direction. Here, the area from the position where the clutch 11 is engaged (the position shown in FIG. 7a) to the position at which the clutch 11 starts to be disengaged (the position shown in FIG. 11a) is a so-called "play area." A large load is not applied to the clutch actuator 14 within this area. At the starting position of disengagement, the center pivot axis C3 of the assist spring unit 25, the contacting point between the contact portion 25d of the assist spring unit 25 and the cam portion 19b of the first solid of the revolution 19 and the axis of rotation C1 of the first solid of revolution 19 are aligned in a straight line (FIG. 11a). Therefore, the urging force of the assist spring unit 25 does not function as the force to rotate the first solid of revolution 19. In other words, the assist force of the assist spring unit 25 becomes zero.

Figure 12B:
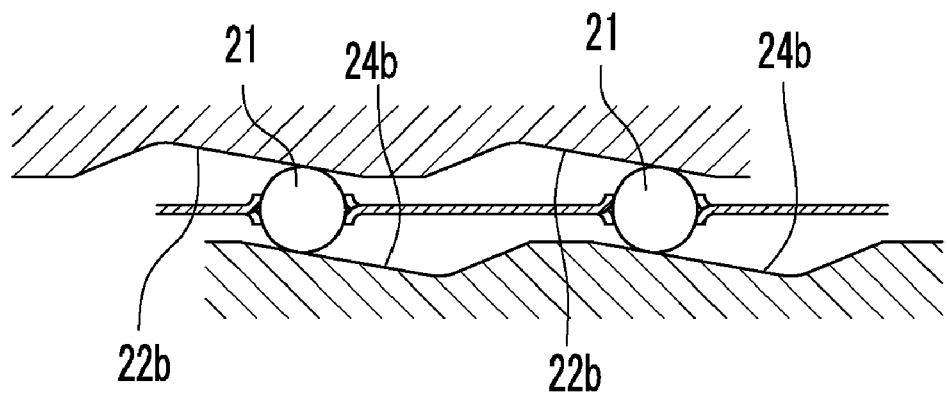
FIG. 12b is a schematic view which shows the positions of balls of a ball cam when the clutch is disengaged.
Figure 13:
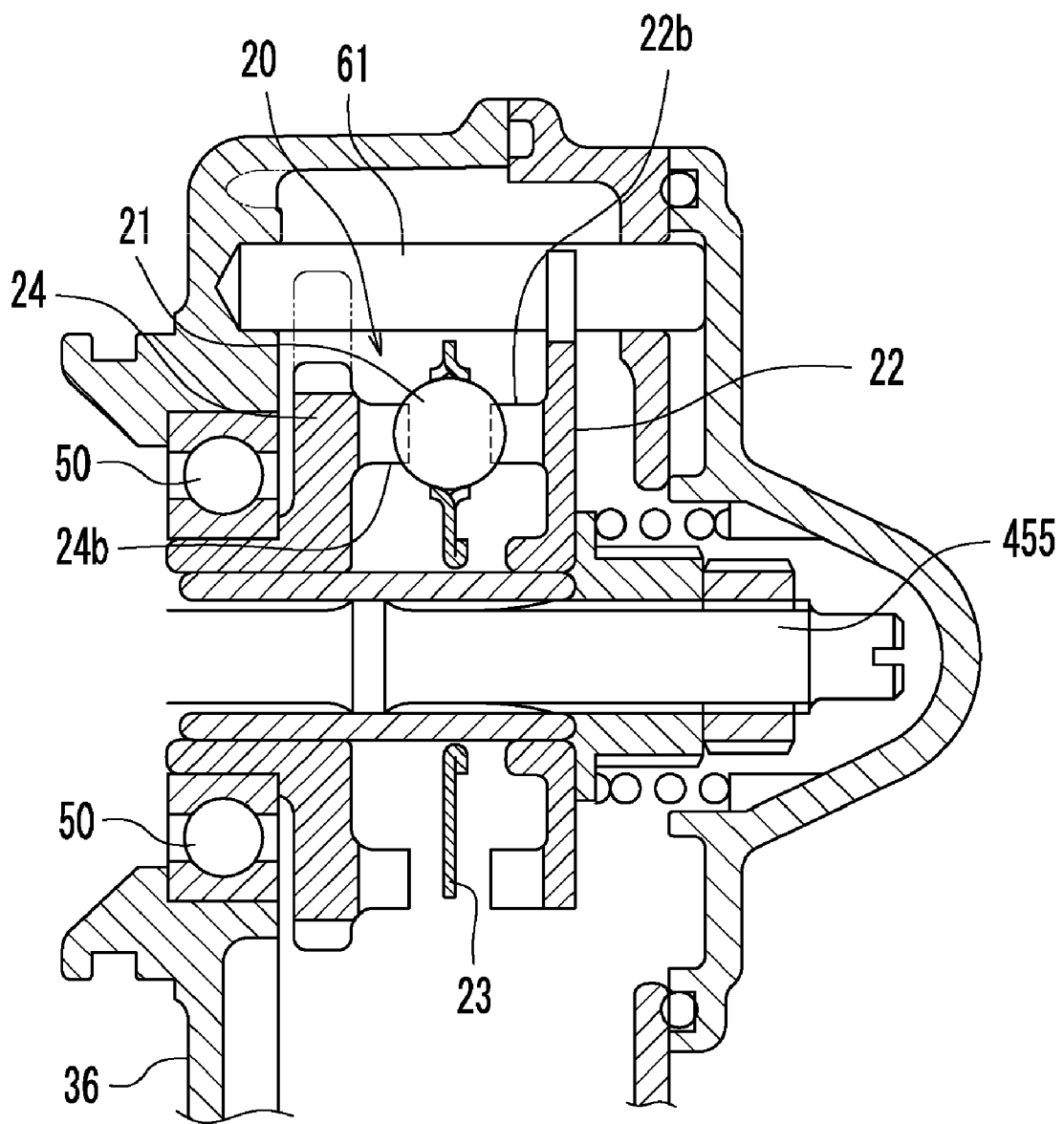
FIG. 13 is a cross-sectional view of the ball cam when the clutch is disengaged.

When the worm shaft 16 rotates farther from the starting position of disengagement, the first solid of revolution 19 rotates farther in the clockwise direction. Then, the second solid of revolution 24 rotates farther in the counterclockwise direction in accordance with the rotation of the first solid of revolution 19. Accordingly, as shown in FIG. 12b, the balls 21 of the ball plate 23 of the ball cam 20 climb to some extent along the cam surface 22b of the cam plate 22 and the cam surface 24b of the second solid of revolution 24. As a result, the cam plate 22 is pushed away from the second solid of revolution and in the direction to disengage the clutch 11 by the balls 21. Specifically, the cam plate 22 is pushed to the right, i.e. it moves rightward together with the slide shaft 455 as cam plate 22 is fixed to the slide shaft 455 (see FIG. 13). In this manner, the pressure plate 451 is moved rightward and the clutch 11 is disengaged.

As shown in FIG. 12a, when the first solid of revolution 19 rotates in the clockwise direction beyond the starting position of disengagement, the contact point between the contact portion 25d of the assist spring unit 25 and the cam portion 19b of the first solid of revolution 19 shifts downward in FIG. 12a beyond the line which connects the center pivot axis C3 of the assist spring unit 25 and the axis of rotation C1 of the first solid of revolution 19. Therefore, the urging force of the assist spring unit 25 functions as the force to rotate the first solid of revolution 19 in the clockwise direction, namely, as the assist force in the direction to disengage the clutch 11. In this manner, the load of the clutch actuator 14 is reduced.

The abovementioned generally describes the operation when the clutch 11 is disengaged. When the clutch 11 is to be engaged, the inverse operation to the abovementioned operation is performed.

Effects of the Embodiment

As mentioned above, with the power unit 35 configured according to the present embodiment, the clutch actuator 14 and the drive force transmission mechanism 15 are arranged at the right end portion on the inside of the casing 39 of the power unit 35 as shown in FIG. 5. Consequently, the clutch actuator 14 and the drive force transmission mechanism 15 advantageously do not project outside of the casing 39.

Further, as shown in FIG. 7a, the drive force transmission mechanism 15 has a plurality of solids of revolution (namely, the first solid of revolution 19 and the second solid of revolution 24), the axes of which are separated from each other. The drive force is transmitted from the clutch actuator 14 to the clutch 11 via the solids of revolution 19, 24. Accordingly, without disposing a rod or the like which would further project in one direction as is conventionally done, the drive force can be transmitted from the clutch actuator 14 to the clutch 11. Therefore, the drive force transmission mechanism 15 can be compactly arranged in the casing 39.

Furthermore, since the clutch actuator 14 is arranged so that the drive shaft 14B extends in a direction that is perpendicular to the crosswise direction, projecting of the clutch actuator 14 in the crosswise direction can be prevented. Therefore, the clutch actuator 14 can also be compactly arranged within the casing 39. Accordingly, downsizing of a power unit 35, which includes a clutch actuator 14, can be achieved.

In addition, the power unit 35 of the present embodiment includes the assist spring unit 25 which assists with the disengagement of the clutch 11. The assist spring unit 25 is configured to swing in the plane which is perpendicular to the longitudinal axis of the slide shaft 455. Thus, the required drive force of the clutch actuator 14 can be reduced significantly. Accordingly, the clutch actuator 14 can be further downsized, and the downsizing of the power unit 35 can in turn be further enhanced. In addition, since the assist spring unit 25 is configured to swing in a plane perpendicular to the axial direction of the slide shaft 455, thereby projection of the assist spring unit 25 in the crosswise direction (namely, the vehicle-width direction) can be suppressed. In this manner, further downsizing of the power unit can be achieved.

Furthermore, as shown in FIG. 7a, the axis of rotation C1 of the first solid of revolution 19, the axis of rotation C2 of the second solid of revolution 24 and the center pivot axis C3 of the assist spring unit 25 are not aligned in a straight line in the cross-sectional view. In other words, the axis of rotation C1, the axis of rotation C2 and the center pivot axis C3 are arranged to be apexes of a triangle. This allows for drive force transmission mechanism 15 and assist spring unit 25 to be compactly arranged. Thus, the transmitting distance of the drive force and the assisting spring force can be shortened. As a result, further downsizing of the power unit 35 can be achieved. If the axis of rotation C1, the axis of rotation C2 and the center pivot axis C3 were arranged in a straight line, the first solid of revolution 19, second solid of revolution 24 and assist spring unit 25 within casing 39 would be arranged in a straight line, thereby increasing the space requirements.

In the present embodiment, the clutch 11 is configured as a multiplate clutch. As shown in FIG. 4, the drive force transmission mechanism 15 and the assist spring unit 25 are arranged within an outer profile 11a of the abovementioned multiplate clutch 11 in the side view. Therefore, further downsizing of the power unit 35 can be achieved.

As shown in FIG. 5, in the power unit 35 of the present embodiment, the clutch 11 is arranged on the right side of the center in the crosswise direction within the casing 39. The clutch actuator 14 and the drive force transmission mechanism 15 are also arranged on the right side of the center in the crosswise direction within the casing 39. In other words, the clutch actuator 14 and the drive force transmission mechanism 15 are arranged on the same side in the crosswise direction as where the clutch 11 is arranged in the casing 39. Therefore, the distance between the clutch actuator 14 and the clutch 11 is shortened and the drive force transmission mechanism 15 can be downsized.

Further, as shown in FIG. 5, the power unit 35 of the present embodiment includes the four-cylinder engine 30. Engine 30 includes crankshaft 31 which extends in the crosswise direction in the casing 39. Thus, at least a portion of the clutch actuator 14 and a portion of the drive force transmission mechanism 15 are arranged relative to the right end portion 31a of the crankshaft 31 so as not to project beyond the crankshaft 31 in the crosswise direction. Thus, the power unit 35 can be made more compact in the crosswise direction, i.e. it can be slimmer.

The casing 39 of the power unit 35 of the present embodiment includes the crankcase 36 and the cover 38 which are assembled together. In the plan view of FIG. 5, the mating surface 39a between the crankcase 36 and the cover 38 angles inwardly toward the center of the power unit 35 in the crosswise direction as the mating surface 39a approaches the rear side of the power unit 35. The clutch actuator 14 is arranged posterior to the slide shaft 455. That is, in the power unit 35 of the present embodiment, the mating surface 39a is tilted, thereby the space at the right side of the crankcase 36 becomes larger toward the rear. In order to effectively utilize this space, the clutch actuator 14 is arranged posterior to the slide shaft 455 in the present embodiment. Therefore, the clutch actuator 14 can be compactly arranged.

As shown in FIG. 4, in the present embodiment, the clutch actuator 14 is an electric motor having the drive shaft 14B which extends in the vertical direction and the motor body 14A which is arranged above the drive shaft 14B. With such an arrangement, the dimensions of the electric motor 14 in the longitudinal direction and the crosswise direction may be shortened. Therefore, the power unit 35 can be formed compactly in the longitudinal direction and the crosswise direction.

Further, in the power unit 35 of the present embodiment, the force direction converting mechanism which converts the torque of the second solid of revolution 24 into a force in the axial direction of the slide shaft 455 is implemented as the ball cam 20. By utilizing the ball cam 20 as mentioned above, the transmission efficiency of the drive force from the clutch actuator 14 to the slide shaft 455 is increased and the force direction converting mechanism itself can be compactly formed. Further, a ball cam can produce a large speed reducing ratio in general, thereby a required speed reducing ratio of the other parts of the drive force transmission mechanism 15 can be suppressed in size. Accordingly, the structure of the other parts of the drive force transmission mechanism 15 can be simplified and further downsizing of the power unit 35 can be achieved.

Modification

The abovementioned embodiment is just one of the possible embodiments for implementing the present invention. The present invention can also be implemented with other various forms.

In the above embodiment, the vehicle to which the power unit 35 for a vehicle according to the present invention is mounted is the motorcycle 1. However, the vehicle according to the present invention is not limited to the motorcycle 1, but can be any other straddle-type vehicle. In addition, the vehicle according to the present invention can be a vehicle other than a straddle-type vehicle.

In the above embodiment, the drive force transmission mechanism 15 has two solids of revolution, which are the first solid of revolution 19 and the second solid of revolution 24. However, the number of the solids of revolution of the drive force transmission mechanism 15 can be two or more.

In the above embodiment, the force direction converting mechanism of the drive force transmission mechanism 15 is implemented as the ball cam 20. However, the force direction converting mechanism may be implemented in other ways, i.e. other than using ball cam 20. For example, a worm gear or the like can be utilized as the force direction converting mechanism.

Thus, it is to be clearly understood that the above description was made only for purposes of an example and not as a limitation on the scope of the invention as claimed herein below.

What is claimed:

1. A power unit for a vehicle, the power unit comprising:
   a clutch having a slide shaft with a longitudinal axis that extends in a vehicle crosswise direction, the clutch being disengaged and engaged by moving the slide shaft along its longitudinal axis;
   a clutch actuator with a rotatable drive shaft that extends in a direction that is perpendicular to the longitudinal axis; and
   a drive force transmission mechanism configured to transmit the drive force of the clutch actuator to the slide shaft, the drive force transmission mechanism comprising:
   a worm shaft coupled to the rotatable drive shaft;
   a first solid of revolution having a worm wheel portion which engages the worm shaft and rotates about an axis of rotation which is parallel to the longitudinal axis of the slide shaft in accordance with rotation of the worm shaft;
   a second solid of revolution which rotates about an axis of rotation coincident with the longitudinal axis of the slide shaft in accordance with rotation of the first solid of revolution; and
   a force direction converting mechanism which converts torque from the second solid of revolution into a force acting in the axial direction of the slide shaft and which moves the slide shaft in the axial direction in accordance with rotation of the second solid of revolution.

2. The power unit of claim 1, further comprising an elastic body which is pivotally supported at a first end to swing in the plane perpendicular to longitudinal axis of the slide shaft, the elastic body being connected to the first solid of revolution at a second end that is biased away from the first end, the elastic body configured to urge the first solid of revolution in a direction to disengage the clutch during at least a portion of the disengagement process.

3. The power unit of claim 2, wherein the axis of rotation of the first solid of revolution, the axis of rotation of the second solid of revolution and the center pivot axis of the elastic body are arranged as the apexes of a triangle.

4. The power unit of claim 2, wherein the clutch is a multiplate clutch, and the drive force transmission mechanism and the elastic body are arranged inside an outer circumferential profile of the multiplate clutch when viewed along the longitudinal axis of the slide shaft.

5. The power unit of claim 1, further comprising a casing configured to accommodate the clutch, the clutch actuator, the drive force transmission mechanism, and a main shaft of a transmission, the clutch actuator and the drive force transmission mechanism being arranged adjacent one end of the main shaft on the inside of the casing.

6. The power unit of claim 5, wherein the main shaft extends in the crosswise direction of the vehicle and the clutch is arranged in the casing on the left end or right end of the main shaft, and the clutch actuator and the drive force transmission mechanism are arranged in the casing adjacent the same end of the main shaft where the clutch is arranged.

7. The power unit of claim 5, wherein the main shaft extends in the crosswise direction of the vehicle, and the power unit further comprising a multi-cylinder engine which has a crankshaft extending in the crosswise direction in the casing, wherein at least a portion of the clutch actuator and a portion of the drive force transmission mechanism are arranged closer to a center of the crankshaft in the crosswise direction than an end portion of the crankshaft on the side where the clutch actuator and the drive force transmission mechanism are disposed.

8. The power unit of claim 5, wherein the casing includes a crankcase, which covers at least the clutch, and a cover which is attached to the crankcase along a mating surface, wherein the mating surface angles inwardly in the crosswise direction of the vehicle as the matting surface approaches the rear side of the power unit.

9. The power unit of claim 1, wherein the clutch actuator further comprises an electric motor configured to turn the drive shaft, the electric motor having a cylindrical motor body that is arranged longitudinally above the drive shaft.

10. The power unit of claim 1, wherein the force direction converting mechanism comprises a ball cam.

11. A vehicle comprising the power unit of claim 1.

12. The power unit of claim 1, further comprising a transmission.

13. The power unit of claim 12, further comprising a shift actuator configured to operate the transmission.

14. The power unit of claim 13, further comprising at least one automatic transmission operation switch.

15. The power unit of claim 10, wherein a side face of the second solid of revolution comprises a cam surface of the ball cam.

16. The power unit of claim 10, wherein the ball cam includes a cam plate, a ball plate and the second solid of revolution.

17. The power unit of claim 16, wherein the cam plate is fixed to the slide shaft and is movable in the axial direction of the slide shaft together with the slide shaft.

18. The power unit of claim 17, wherein rotation of the cam plate around the slide shaft is restricted by a stopper pin.

19. The power unit of claim 17, wherein the ball plate supports a plurality of balls arranged at even intervals in a peripheral direction so as to be able to roll.

* * * * *